March 7, 1967 R. B. BENNETT ET AL 3,307,433
COMPOUND PLANETARY SPEED REDUCER WITH ADJUSTABLE GEARING
Filed Dec. 2, 1963 2 Sheets-Sheet 2
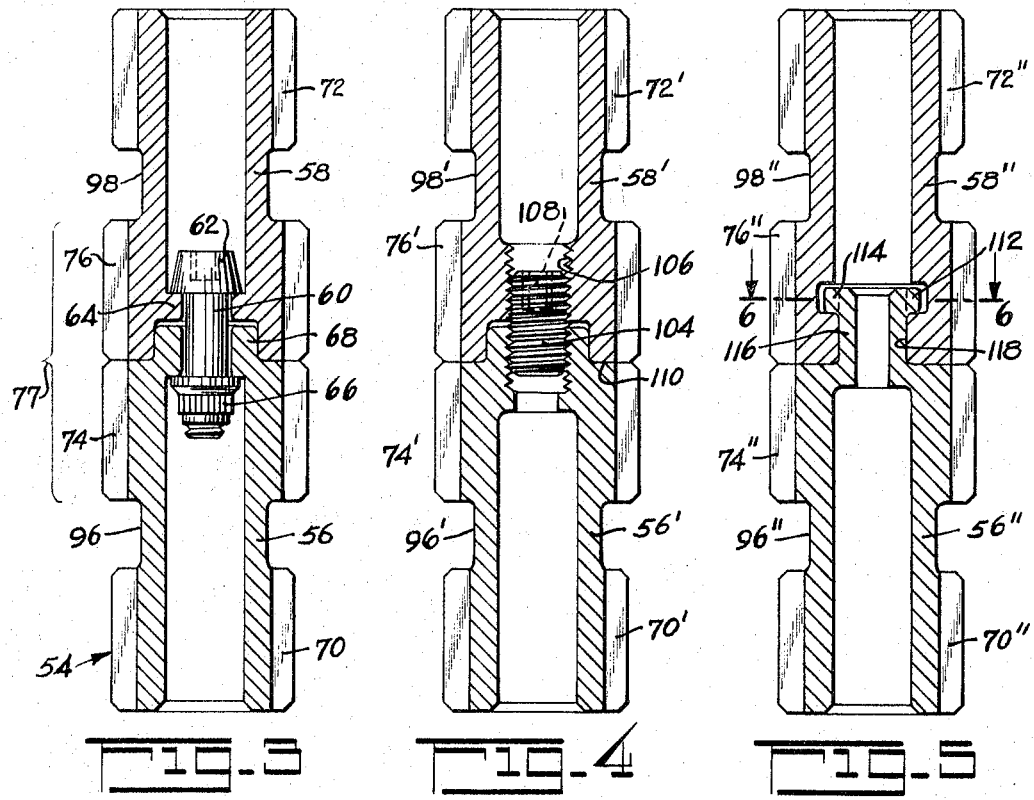
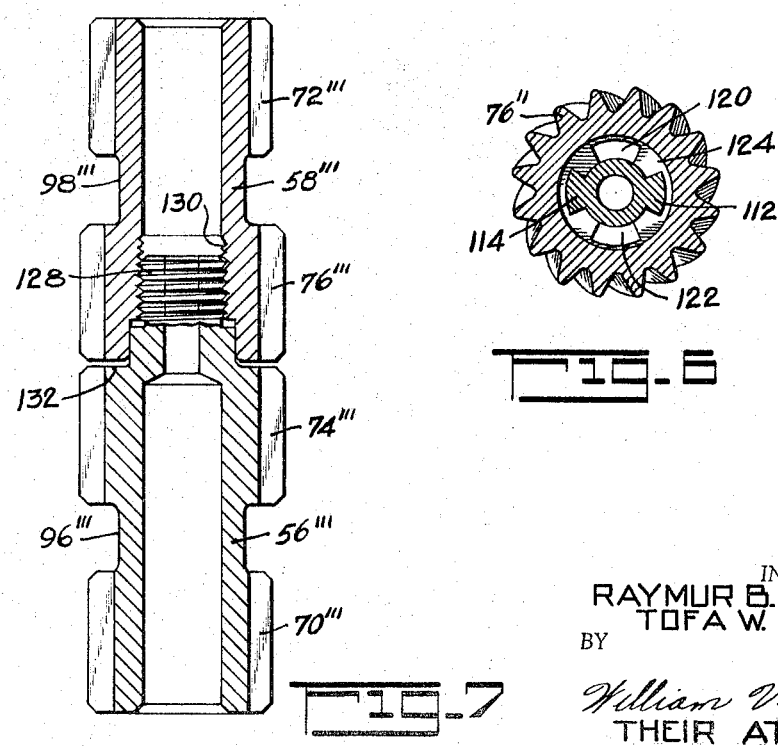
INVENTORS
RAYMUR B. BENNETT
TOFA W. KHIRALLA
BY
*William V. Ebs*
THEIR ATTORNEY United States Patent Office 3,307,433
Patented Mar. 7, 1967

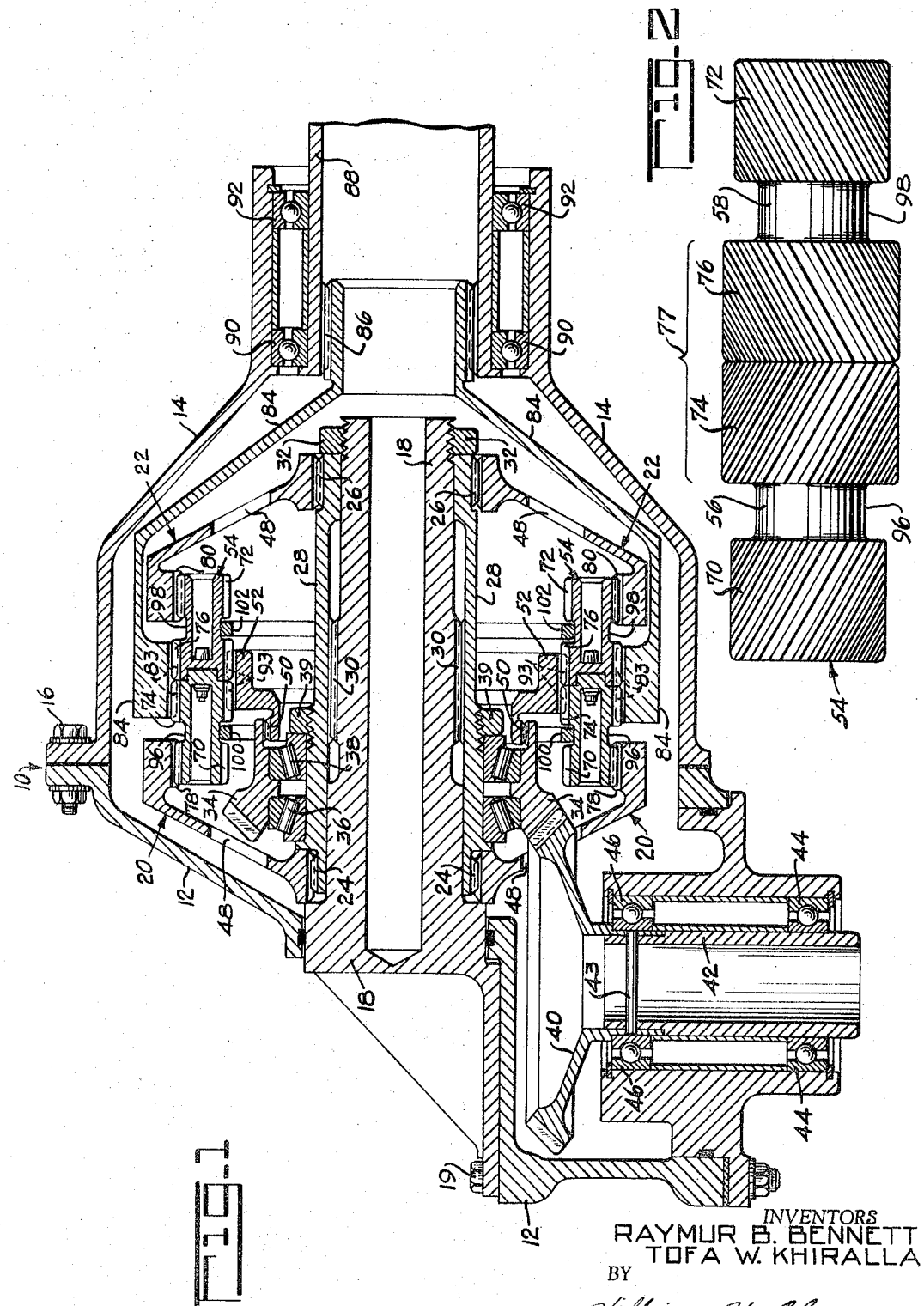

3,307,433
COMPOUND PLANETARY SPEED REDUCER
WITH ADJUSTABLE GEARING
Raymur B. Bennett, Wayne, and Tofa W. Khiralla, Caldwell Township, N.J., assignors to Curtiss-Wright Corporation, a corporation of Delaware
Filed Dec. 2, 1963, Ser. No. 327,257
3 Claims. (Cl. 74—801)

Our invention relates to rotary speed changes of the epicyclic variety having compound planetary members and relatively movable ring gears as component parts.

More particularly the invention is directed to speed changers of the type disclosed, for example, in Patent No. 3,009,355 for Planetary Speed Reducer and Power Actuated Hinge Device, issued November 14, 1961, to D. Grudin; in Patent No. 2,944,444 for Rotary Speed Changer, issued July 12, 1960, to W. E. Burns; and in the copending application, Serial No. 287,360, now Patent No. 3,258,995, filed July 12, 1963 of Raymur B. Bennett et al., wherein each of a plurality of planetary members has an intermediate gear in engagement with one internal ring gear and end gears in engagement with other internal ring gears such that tangential loads on the intermediate gears of the planetary members are balanced by reactions against the ring gears engaging the end gears of the planetary members.

It is an object of the invention to provide a speed changer of the described type in which gears of the device automatically adjust to effect simultaneous and precise engagement of meshing gear teeth.

It is another object of the invention to provide a speed changer of the described type having planetary members with complementary parts which can be turned relative to each other to effect an adjustment of meshing gears in the speed changer, but which are restrained against further relative turning during operation of the device.

It is still another object of the invention to provide a speed changer in which gears of the device automatically adjust to prevent cocking of the planetary members and excessive wear on the planetary gears.

It is a further object of the invention to provide an improved planetary member having an intermediate gear and end gears, and comprising complementary parts, each of which includes one of the end gears and teeth of the intermediate gear, and each of which can be turned relative to the other to effect a slight relative rotational adjustment of the gear teeth on the respective parts.

It is yet another object of the invention to provide an improved planetary member as described on which the intermediate gear is a herringbone gear and wherein the complementary parts are separable.

Other objects and advantages of the invention will become apparent hereinafter.

The speed changer of the invention includes a pair of internal ring gears spaced apart on a common axis, and a plurality of planetary members each of which is formed with two relatively turnable portions. One such portion of each planetary member includes gear teeth which mesh with one of the said ring gears, and the other portion includes gear teeth which mesh with the other ring gear. Each planetary member includes a herringbone gear with helical gear teeth of one hand on one of the turnable portions and helical gear teeth of the opposite hand on the other portion. A third ring gear coaxial with the other two ring gears is provided with herringbone gear teeth which mesh with the herringbone gear on each planetary member. The third ring gear is relatively movable both rotationally and axially with respect to the other ring gears. A sun gear mounted for rotation and axial movement, and having herringbone gear teeth meshes with the herringbone gear on each of the planetary members.

Referring to the drawings:
FIGURE 1 is a vertical longitudinal sectional view of a speed changer embodying features of the invention;
FIGURE 2 is an enlarged plan view showing a planetary member of the speed changer of FIGURE 1;
FIGURE 3 is an enlarged vertical longitudinal sectional view of the planetary member of FIGURE 2;
FIGURE 4 is a vertical longitudinal sectional view showing a modified construction for the planetary members of the speed changer;
FIGURE 5 is a vertical longitudinal sectional view showing another modified construction for the planetary members of the speed changer;
FIGURE 6 is a cross sectional view taken on the plane of the line 6—6 of FIGURE 5; and
FIGURE 7 is a vertical longitudinal sectional view showing still another modified construction for the planetary members of the speed changer.

Referring to the drawings, reference character 10 designates a housing which comprises portions 12 and 14 that are bolted together at their peripheries as at 16. A shaft 18 is shown secured to the housing portion 12 at 19. Spaced along the shaft 18 are a pair of ring gears 20 and 22 which are spline connected at 24 and 26 respectively to a sleeve 28. The sleeve 28 is splined connected to the shaft 18 at 30 and is secured in a fixed axial position by means of the nut 32 having a threaded connection with the shaft. Ring gear 20 is secured between the shaft 18 and sleeve 28, and the ring gear 22 is secured between the nut 32 and sleeve 28.

A bevel gear 34 is rotatably mounted on sleeve 28 by means of bearings 36 and 38 which are designed to support both radial and axial loads. Such bearings, which are secured upon sleeve 28 by the nut 39, maintain bevel gear 34 in a fixed axial position relative to shaft 18. Bevel gear 34 meshes with a bevel gear 40 that is secured by pin 43 to a shaft 42 which is rotatably mounted on bearings 44 and 46 in housing portion 12. Gear 40 projects through one of a plurality of openings 48 in ring gear 20 to mesh with bevel gear 34.

Bevel gear 34 connects through splines at 50 with a sun gear 52 which engages each of a plurality of compound planetary members 54. Each planetary member is formed with two portions 56 and 58 which are assembled by an axially extending bolt 60 (FIGURES 2 and 3). The bolt has an integral head 62 at one end which engages an internal flange 64 in portion 56 of the planetary member and has threads at the other end upon which a serrated nut 66 is tightened against internal flange 68 in the portion 58 of the planetary member to prevent axial separation of the planetary member portions in the speed changer. The nut is snug against the flange 68, however it is not excessively tight but is left so that the parts 56 and 58 can turn relative to each other in the speed changer to effect an adjustment of meshing gears in the device.

Each planetary member includes end gears 70 and 72 which are on planetary member portions 56 and 58 respectively, and opposite hand helical toothed portions 74 and 76 therebetween which together form a herringbone gear 77. Helical toothed portions 74 are on planetary member portions 56 and helical toothed portions 76 are on the planetary member portions 58, as shown. End gear 70 on the planetary member portions 56 engage internal toothed portion 78 of ring gear 20, and end gear 72 on the planetary member portions 58 engage internal toothed portion 80 of ring gear 22. The herringbone gear 77 on each planetary member formed by toothed portions 74 and 76 engages internal herringbone gear teeth 83 of a ring gear 84 which connects at splines 86 with a shaft 88 shown rotatably mounted on bearings 90 and 92 in housing portion 14. Sun gear 52 has herringbone gear teeth 93 which mesh with the teeth of each of the herringbone gears on the planetaries.

Preferably, the end gears 70 and 72 of the planetary members and the internal toothed portions 78 and 80 of the ring gears 20 and 22 respectively have helical gear teeth so formed that the co-acting helical teeth of end gear 70 and ring gear 20 are opposite in hand to the co-acting helical teeth of end gear 72 and ring gear 22. Except for having opposite hand helical teeth the end gears of the planetary members are alike, as are the ring gears 20 and 22.

The speed change ratio of the overall assembly is established by the application of conventional compound planetary gearing design techniques. In any design, the herringbone gear teeth 83 on ring gear 84 will differ in number as required from the teeth of ring gears 20 and 22 which have equal numbers of teeth. The herringbone gear teeth on each of the planetary members may differ or correspond in number to the teeth of the planetary member end gears 70 and 72 having equal numbers of teeth.

Each of the planetaries includes a cylindrical annular portion 96 on planetary member portion 56, and a like annular portion 98 on planetary member portion 58. Preferably, these annular portions are no greater in diameter than the root diameter of any of the toothed portions on the planetary members and the toothed portions thereon all have the same number of teeth arranged so that a cutting tool may pass from one end of planetary member portion 56 or 58 to the other end of the portion when the teeth thereon are machined. Rings 100 and 102 concentric with the axis of shaft 18 engage the annular portions 96 and 98, and serve to hold the planetary members outwardly in mesh with the several ring gears.

When shaft 42 is rotated, bevel gears 40 and 34 are caused to rotate and drive the sun gear 52 which in turn drives the planetary members 54. The end gears 70 and 72 of the planetary members react against the internal toothed portions 78 and 80 of the fixed ring gears and the herringbone gear on each of the planetaries reacts against the internal herringbone gear on ring gear 84 to thereby impart rotation to the ring gear 84 and shaft 88. The planetary members 54 rotate about their own axes as well as revolve about the axis of shaft 18. At the same time rings 100 and 102 which maintain rolling contact with annular portions 96 and 98 respectively of the planetary members roll about the axis of shaft 18.

Either of the shafts 42 or 88 may serve as the input shaft of the speed changer of FIGURE 1 in which event the other shaft becomes the output shaft. When shaft 42 is the input shaft, the device operates as described and the output speed of shaft 88 is much less than the speed of shaft 42. When power is applied to shaft 88, the device operates in a generally similar manner and shaft 42 which then becomes the output shaft is caused to turn at a much faster rate than the shaft 88.

Gears are automatically adjusted upon the application of power to the device by slight relative rotational movement of the two portions 56 and 58 of each planetary member, and accompanying axial movements of the planetary members 54, sun gear 52 and ring gear 84. In this manner, simultaneous and precise engagement of all meshing gears in the gear train between the sun gear 52 and ring gear 84 is assured, and any misalignment of the opposite hand helical portions of the herringbone gear teeth on ring gear 84 or on sun gear 52, as well as any misalignment of opposite hand helical teeth on the ring gears 20 and 22 compensated for. After the initial relative rotation of the two portions of each of the planetary members 54 occurring during adjustment of the gears, each of the planetary members functions as though formed in one piece, further relative rotation of the portions of each of the planetary members being prevented by the herringbone gear teeth on the sun gear 52 and ring gear 84.

Besides contributing to the adjustment of the gears in the speed changer, the multi-part construction of the planetaries 54 facilitates machining the herringbone gear teeth on these members and the meshing herringbone gear teeth on the sun gear 52 and ring gear 84. While the opposite hand portions of the herringbone gears on the planetaries, sun gear and ring gear would have to be very carefully aligned to assure proper operation of the speed changer if the planetaries were one-piece members, the same attention need not be given to their alignment in the speed changer of the invention. With the multi-part planetary members 54, alignment of the side by side helical gear teeth thereon presents no problem at all. The teeth may be machined on each of the portions 56 and 58 prior to their assembly without regard to alignment. As to the herringbone gear teeth on sun gear 52 and ring gear 84 some inaccuracy in alignment of the adjacent helical portions can be tolerated since the planetary member portions can turn relative to each other and move axially to adjust to such misalignment in the speed changer.

FIGURES 4 to 7 show modified types of planetary members suitable for use in the speed changer. Such modified planetary members are generally similar to the planetary member of FIGURES 2 and 3, in that they are also multi-part members and have gear teeth formed thereon which are like the gear teeth on the planetary members already described. The modified planetary members differ from the planetary members already described primarily in the manner in which the parts are assembled. Parts in FIGURES 4 to 7 corresponding to parts in FIGURES 1, 2 and 3 are designated by like reference characters except that prime marks have been added to the reference characters in FIGURES 4 to 7.

Referring to FIGURE 4 it may be seen that the portions 56' and 58' which include opposite hand helical toothed portions 74' and 76' respectively forming a herringbone gear and which also include the end gears 70' and 72' respectively are connected by means of an Allen screw 104. The portions 56' and 58' are assembled by first turning Allen screw 104 into a tapped opening in one of the portions as for example the tapped opening 106 in portion 58', and then holding the Allen screw 104 with a suitable tool inserted into the recessed end of the screw at 108 while the other planetary member portion 56' is screwed onto the Allen screw. As the portions 56' and 58' come close to contacting, the Allen screw is manipulated to cause the helical toothed portions 74' and 76' to come into alignment when the two portions just barely contact at 110. The planetary can thereafter be assembled in the speed changer where the portions 56' and 58' will relatively turn slightly as required to adjust the gearing in the manner described hereinbefore.

Planetary member portions 56" and 58" of the planetary of FIGURES 5 and 6 are assembled by means of a bayonet type connection which includes flange segments 112 and 114 on the end projection 116 integral with portion 58", and the opening 118 in portion 58", the opening 118 being slotted at 120 and 122 to receive the flange segments, and enlarged at the one end, that is at 124, to a diameter slightly greater than the diameter across the flanged segments. The portions 56" and 58" are assembled by inserting the end projection 116 into opening 118 with flange segments 112 and 114 in the slots 120 and 122 respectively. When the flange segments are in the enlarged part of the opening in portion 58" at 124, the portions 56" and 58" are turned relative to each other to lock the parts together. The planetary member is assembled in the speed changer with the helical toothed portions 74" on planetary member portion 56", and 76" on planetary member 58', substantially aligned. The portions 56" and 58" thereafter adjust in the speed changer as required in the manner already described.

The planetary member portions 56''' and 58''' of the planetary of FIGURE 7 are joined by screwing these parts together. Portion 56''' having end gear 70''' and helical toothed portion 74''' thereon includes threaded end projection 128, whereas the portion 58''' which includes end gear 72''' and helical toothed portion 76''' is provided with a threaded opening 130. The portions 56''' and 58''' are assembled merely by screwing end projection 128 into the threaded opening 130 until only a slight gap 132 remains between opposing end faces of the parts and the helical teeth 74''' and 76''' are substantially aligned. Final adjustment of the respective portions of the planetary members occurs in the speed changer.

Applicant has shown and described one form of speed changer and several modified forms of one of the components. It will be apparent to those skilled in the art that still other modifications and various changes may be made in the speed changer without departing from the spirit and scope of the invention. We aim to cover all such changes and modifications in the appended claims.

What is claimed is:

1. An epicyclic gear train comprising a pair of fixed internally toothed ring gears spaced apart on a common axis, one of the said gears having helical teeth of one hand and the other gear having helical teeth of the opposite hand; a plurality of axially movable compound planetary members each of which includes one portion having helical gear teeth in mesh with the gear teeth of one of the fixed ring gears, and another portion having helical gear teeth in mesh with the gear teeth of the other fixed ring gear, each planetary member including a herringbone gear having helical gear teeth of one hand on one of the said portions and helical gear teeth of the opposite hand on the other of said portions, said planetary members each including means rendering the portions thereof relatively turnable during operation of the gear train; a third ring gear coaxial with the said fixed ring gears and having internal herringbone gear teeth in mesh with the teeth of the herringbone gear on each planetary member; means mounting said third ring gear for rotation and axial movement; a sun gear having herringbone gear teeth in mesh with the herringbone gear on each planetary member; and means mounting the sun gear for rotation and axial movement.

2. An epicyclic gear train comprising a pair of gears spaced apart on a common axis, one of the said gears having helical teeth of one hand and the other gear having helical teeth of the opposite hand; a plurality of axially movable compound planetary members each of which includes one portion having helical gear teeth in mesh with the gear teeth of one of said pair of spaced gears and another portion having helical gear teeth in mesh with the gear teeth of the other of the said pair of spaced gears, each planetary member including a herringbone gear having a helical gear teeth of one hand on one of said portions and helical gear teeth of the opposite hand on the other of said portions; said planetary members each including means rendering the portions thereof relatively turnable during operation of the gear train, a gear coaxial with said pair of spaced gears and having internal herringbone gear teeth in mesh with the teeth of the herringbone gear on each planetary member; means mounting such coaxial gear and said pair of spaced gears for relative rotation and relative axial movement; a sun gear having herringbone gear teeth in mesh with the herringbone gear on such planetary member; and means mounting the sun gear for rotation and axial movement.

3. A compound planetary member for an epicyclic gear train, said member comprising axially aligned complementary relatively turnable portions with a bayonet connection therebetween, and including a pair of gears one of which is on one portion and the other of which is on the other portion; a herringbone gear on said member between the gears of said pair having helical gear teeth of one hand on one portion and helical gear teeth of opposite hand on the other portion.

References Cited by the Examiner
UNITED STATES PATENTS

| | | | |
|---|---|---|---|
| 1,217,427 | 2/1917 | Fast | 74—801 |
| 1,299,156 | 3/1919 | Fast | 74—801 X |
| 1,399,549 | 12/1921 | Fast | 74—801 X |
| 1,425,430 | 8/1922 | Wikander | 74—801 |
| 2,700,311 | 1/1955 | Bade | 74—410 X |

DAVID J. WILLIAMOWSKY, Primary Examiner.

J. R. BENEFIEL, Assistant Examiner.